United States Patent
Ichimura (10) Patent No.: US 7,885,283 B2
(45) Date of Patent: Feb. 8, 2011

(54) APPARATUS AND METHOD FOR CONNECTING STORAGE DEVICES

(75) Inventor: Toshio Ichimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 709 days.

(21) Appl. No.: 11/583,503

(22) Filed: Oct. 19, 2006

(65) Prior Publication Data

US 2007/0242617 A1 Oct. 18, 2007

(30) Foreign Application Priority Data

Apr. 13, 2006 (JP) .............................. 2006-111261

(51) Int. Cl.
*H04L 12/54* (2006.01)
(52) U.S. Cl. ..................................... 370/428
(58) Field of Classification Search ........................ None
See application file for complete search history.

(56) References Cited

U.S. PATENT DOCUMENTS

| | | | | |
|---|---|---|---|---|
| 5,432,789 | A * | 7/1995 | Armstrong et al. | 370/254 |
| 5,675,831 | A * | 10/1997 | Caputo | 710/10 |
| 7,386,622 | B2 * | 6/2008 | Tanaka | 709/230 |
| 2003/0189929 | A1 | 10/2003 | Matsuzaki et al. | |
| 2004/0250021 | A1 * | 12/2004 | Honda et al. | 711/114 |
| 2004/0257857 | A1 * | 12/2004 | Yamamoto et al. | 365/154 |
| 2005/0055428 | A1 | 3/2005 | Terai et al. | |

FOREIGN PATENT DOCUMENTS

WO   WO 03/085894   10/2003

* cited by examiner

*Primary Examiner*—Raj K Jain
(74) *Attorney, Agent, or Firm*—Greer, Burns & Crain, Ltd.

(57) ABSTRACT

An apparatus for connecting storage devices including a storage unit that stores connected-device-management information in which first device identification information of a first storage device is associated with second device identification information of a second storage device, the first storage device being connected to the apparatus when the network was constructed, the second storage device being currently connected to the apparatus instead of the first storage device, a receiving unit that, upon receiving data from the storage device currently connected, converts the second device identification information set in received data to the first device identification information based on the connected-device-management information stored in the storage unit, and a transmitting unit that, when transmitting data to the storage device currently connected, transmits the data after converting the first device identification information set in the data to the second device identification information based on the connected-device-management information stored in the storage unit.

15 Claims, 8 Drawing Sheets

| SERIAL NUMBER | MAPPED NUMBER | WWNN | WWPN | DEVICE INFORMATION |
|---|---|---|---|---|
| 0 | 0 | WWNN0 | WWPN0 | VENDOR NAME0, APPARATUS NAME0, MODEL NAME0 |
| 1 | NULL | WWNN1 | WWPN1 | VENDOR NAME1, APPARATUS NAME1, MODEL NAME1 |
| 2 | 1 | WWNN1 | WWPN2 | VENDOR NAME2, APPARATUS NAME2, MODEL NAME2 |
| ⋮ | ⋮ | ⋮ | ⋮ | ⋮ |

FIG.4

STATE 1                                                                      120

| SERIAL NUMBER | MAPPED NUMBER | WWNN | WWPN | DEVICE INFORMATION |
|---|---|---|---|---|
| 0 | 0 | WWNN0 | WWPN0 | VENDOR NAME0, APPARATUS NAME0, MODEL NAME0 |
| 1 | 1 | WWNN1 | WWPN1 | VENDOR NAME1, APPARATUS NAME1, MODEL NAME1 |
| ⋮ | ⋮ | ⋮ | ⋮ | ⋮ |

STATE 2    ADD DEVICE ↓ REGISTER DEVICE INFORMATION OF DEVICE HAVING WWPN2    120

| SERIAL NUMBER | MAPPED NUMBER | WWNN | WWPN | DEVICE INFORMATION |
|---|---|---|---|---|
| 0 | 0 | WWNN0 | WWPN0 | VENDOR NAME0, APPARATUS NAME0, MODEL NAME0 |
| 1 | 1 | WWNN1 | WWPN1 | VENDOR NAME1, APPARATUS NAME1, MODEL NAME1 |
| 2 | 2 | WWNN1 | WWPN2 | VENDOR NAME2, APPARATUS NAME2, MODEL NAME2 |
| ⋮ | ⋮ | ⋮ | ⋮ | ⋮ |

STATE 3    PERFORM DEVICE INVALIDATION PROCESSING ↓ INVALIDATE DEVICE HAVING WWPN1    120

| SERIAL NUMBER | MAPPED NUMBER | WWNN | WWPN | DEVICE INFORMATION |
|---|---|---|---|---|
| 0 | 0 | WWNN0 | WWPN0 | VENDOR NAME0, APPARATUS NAME0, MODEL NAME0 |
| 1 | NULL | WWNN1 | WWPN1 | VENDOR NAME1, APPARATUS NAME1, MODEL NAME1 |
| 2 | 2 | WWNN1 | WWPN2 | VENDOR NAME2, APPARATUS NAME2, MODEL NAME2 |
| ⋮ | ⋮ | ⋮ | ⋮ | ⋮ |

STATE 4    PERFORM MAPPING CHANGE PROCESSING ↓ SPECIFY SERIAL NUMBER OF DEVICE HAVING WWPN1 (TO WHICH CHANGE IS MADE) AS MAPPED NUMBER OF DEVICE HAVING WWPN2 (FROM WHICH CHANGE IS MADE)    120

| SERIAL NUMBER | MAPPED NUMBER | WWNN | WWPN | DEVICE INFORMATION |
|---|---|---|---|---|
| 0 | 0 | WWNN0 | WWPN0 | VENDOR NAME0, APPARATUS NAME0, MODEL NAME0 |
| 1 | NULL | WWNN1 | WWPN1 | VENDOR NAME1, APPARATUS NAME1, MODEL NAME1 |
| 2 | 1 | WWNN1 | WWPN2 | VENDOR NAME2, APPARATUS NAME2, MODEL NAME2 |
| ⋮ | ⋮ | ⋮ | ⋮ | ⋮ |

APPARATUS AND METHOD FOR CONNECTING STORAGE DEVICES

BACKGROUND OF THE INVENTION

1. Field of the Invention

The present invention generally relates to a technology for specifying connection settings between network devices, and specifically relates to specifying connection settings between network devices by using device identification information that uniquely identifies each network device.

2. Description of the Related Art

Conventionally, in a Storage Area Network (SAN), a plurality of servers and a plurality of storages are connected to one network, and security settings are specified to restrict communications between the servers and the storages. To specify the security settings, a World Wide Name (WWN) is specified, in advance, uniquely for fiber channel (FC) ports in FC network devices such as servers, storages, and FC switches. Examples of the WWN include a World Wide Node Name (WWNN) that identifies a device and a World Wide Port Name (WWPN) that identifies an FC port.

For example, an FC switch connects between servers and storages performs setting called zoning. In the zoning setting, FC ports of Host Bus Adaptors (HBAs) in servers and FC ports of storages are divided into groups called zones with the use of WWNs so that access across the zones is restricted.

A server performs setting called target binding. In the target binding setting, the target ID of a storage is associated with the WWN of the storage so that the Small Computer System Interface (SCSI) protocol is mapped to the FC protocol.

A storage specifies setting called host affinity. In the host affinity setting, the HBAs of servers are defined in correspondence with a storage using their respective WWNs so that access from servers having undefined WWNs can be restricted.

Generally, a large number of FC network devices are connected to an SAN. For this reason, to specify the security settings as described above, it is necessary to set a huge number of WWNs to FC network devices, and a large amount of labor is required. This is true not only when a network is initially constructed, but also when some of the FC network devices are replaced due to a failure or the like. In this case, it is necessary to change settings of WWNs for all FC network devices that are related to the FC network devices to be replaced. Consequently, a large amount of labor is also required.

With regard to the operation to construct an SAN including security setting, the large amount of labor and time required by the operation is becoming an issue, and various techniques for reducing the labor and time have been proposed. For example, International Publication Pamphlet No. 03/085894 discloses an apparatus that facilitates the design of an SAN. The conventional apparatus previously inputs therein device information of FC network devices that constitute an SAN, and displays a virtual image of the configuration of a network generated based on the information. Thus, the SAN can be designed easily by visually checking the virtual image.

Even with the conventional apparatus, however, it is necessary to change settings of all related FC network devices so that the labor and time required for the operation cannot be reduced much.

Thus, there is a need of a technology capable of reducing the labor required to change settings of the device identification information.

SUMMARY OF THE INVENTION

It is an object of the present invention to at least partially solve the problems in the conventional technology.

According to an aspect of the present invention, a network device connecting apparatus that specifies connection settings between network devices in a network using device identification information that uniquely identifies each network device includes a storage unit that stores therein connected-device-management information in which the device identification information used in the connection settings is associated with device identification information of a currently-connected network device that is a network device currently connected to the network; a receiving unit that, when having received data from the currently-connected network device, converts device identification information set in received data to the device identification information used in the connection settings based on the connected-device-management information stored in the storage unit; and a transmitting unit that, when transmitting data to the currently-connected network device, transmits the data after converting device identification information set in the data to the device identification information of the currently-connected network device based on the connected-device-management information stored in the storage unit.

According to another aspect of the present invention, a network device connecting method for specifying connection settings between network devices in a network using device identification information that uniquely identifies each network device includes converting, upon receiving data from a currently-connected network device that is a network device currently connected to the network, device identification information set in received data to the device identification information used in the connection settings based on connected-device-management information in which the device identification information used in the connection settings is associated with device identification information of the currently-connected network device; and converting, upon transmitting data to the currently-connected network device, device identification information set in the data to the device identification information of the currently-connected network device based on the connected-device-management information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail with reference to the accompanied drawings. In the following, the present invention is mostly applied, by way of example, to an FC switch. Moreover, WWPNs are used to specify the target binding settings and the zoning settings.

Figure 1:
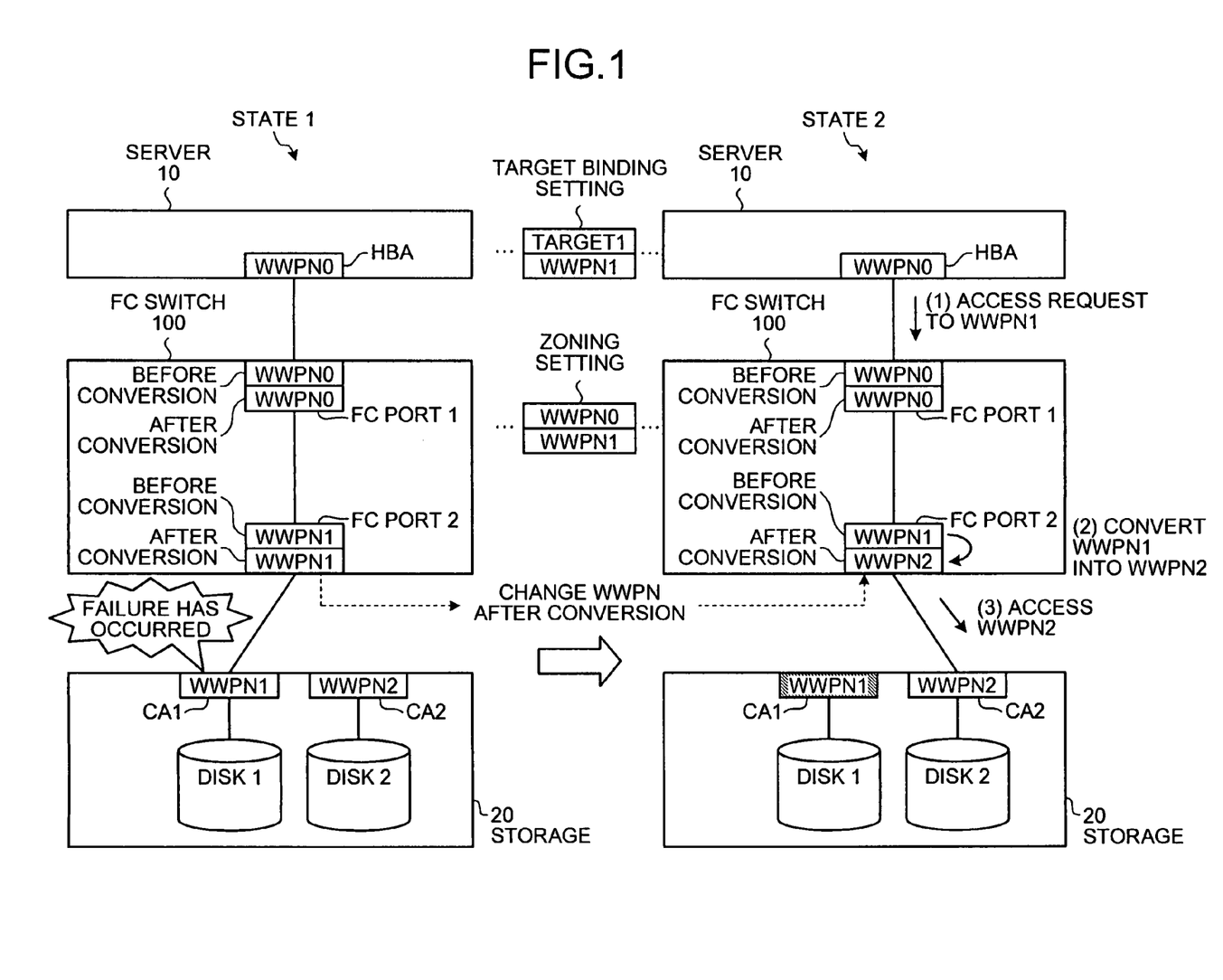
FIG. 1 is a schematic for explaining the concept of an FC switch according to an embodiment of the invention.

FIG. 1 is a schematic for explaining a SAN that includes an FC switch according to the present embodiment. As shown in FIG. 1, the SAN includes a server 10, a storage 20, and an FC switch 100.

In state 1 shown in FIG. 1, the FC switch 100 connects between the server 10 and the storage 20. Specifically, an FC port 1 of the FC switch 100 is connected to an FC port (not shown) of an HBA in the server 10. An FC port 2 of the FC switch 100 is connected to an FC port (not shown) of a Channel Adaptor (CA) 1 in the storage 20.

A unique WWPN is assigned to each of the FC port of the HBA in the server 10 and the FC port of the CA 1 in the storage 20. WWPN0 is assigned to the FC port of the HBA in the server 10. WWPN1 is assigned to the FC port of the CA 1 in the storage 20.

Using the WWPNs, target binding is performed in the server 10 to associate TARGET1 with WWPN1, which are information to enable an operating system (OS) to identify the FC port of the CA 1, so that the connection between the FC port of the HBA in the server 10 and the FC port of the CA 1 in the storage 20 is permitted. Using the WWPNs, a zoning is performed in the FC switch 100 to associate WWPN0 with WWPN1 so that the HBA of the server 10 and the CA 1 of the storage 20 belong to the same zone.

The FC switch 100 stores therein a connected-device management list in which the WWPNs of FC network devices that are currently connected are associated with the WWPNs used in connection settings specified when the SAN was constructed to prepare for the replacement of an FC network device connected to the FC switch 100. For example, if, in state 1 shown in FIG. 1, none of the FC network devices has been replaced yet, the WWPNs of the FC network devices that are currently connected are the same as the WWPNs used in connection settings specified when the SAN was constructed. Thus, WWPN0 that is the WWPN of the FC port of the HBA in the server 10 being connected to the FC port 1 is stored in association with WWPN0. WWPN1 that is the WWPN of the FC port of the CA 1 in the storage 20 being connected to the FC port 2 is stored in association with WWPN1.

In such an SAN, for example, let us assume that a failure has occurred in the CA 1 in the storage 20 and, as shown in state 2 in FIG. 1, the connection destination of the FC port 2 of the FC switch 100 is changed from the FC port (not shown) of the CA 1 connected to a disk 1 to the FC port (not shown) of the CA 2 connected to a disk 2.

According to the change in connection destination, a user (a network administrator, etc.) updates the connected-device management list stored in the FC switch 100 using, for example, a network management terminal in the SAN. For example, when the WWPN of the FC port of the CA 2 in the storage 20 is WWPN2, the user changes, in the connected-device management list, the WWPN associated with WWPN1 (the WWPN of the FC port in the CA 1) from WWPN1 to WWPN2 (the WWPN of the FC port in the CA 2). Thereby, without a change in the target binding setting for the server 10 and the zoning setting for the FC switch 100, data can be transmitted and received between the server 10 and the storage 20.

For example, in state 2 shown in FIG. 1, let us assume that an access request (an FC frame) to the FC port of the CA 1 in the storage 20 is transmitted from the server 10. In the transmitted access request, WWPN1 that is the WWPN of the FC port of the CA 1 in the storage 20 is specified as the transmission destination. In this situation, the FC switch 100 converts the WWPN included in the received access request to WWPN2 that is the WWPN of the FC port of the CA 2 in the storage 20 being connected to the FC switch 100 at this point in time based on the connected-device management list. Then, the FC switch 100 transmits the access request, in which the WWPN has been converted, to the storage 20.

When having received an access response (an FC packet) from the FC port of the CA 2 in the storage 20, the FC switch 100 converts WWPN2, i.e., the WWPN of the FC port of the CA 2 in the storage 20, which has been specified in the access request as the transmission source into WWPN1, based on the connected-device management list. The FC switch 100 then transmits the access response (not shown), in which the WWPN has been converted, to the server 10.

As explained above, when having received data from an FC network device currently connected, the FC switch 100 according to the embodiment converts the WWPN specified in the received data to the WWPN that is used in connection settings based on the connected-device management list in which the device identification information used in connection settings is associated with the WWPN of each FC network device currently connected. On the other hand, when transmitting data to an FC network device currently connected, the FC switch 100 transmits the data after converting the WWPN specified in the data to the WWPN of the FC network device that is currently connected based on the connected-device-management information. Thus, it is possible to eliminate the need to change WWPN settings, which usually takes place when an FC network device is to be replaced due to a failure or the like. Accordingly, it is possible to reduce the amount of labor required to change the settings.

For the convenience of the explanation, only one or two FC ports are shown in each of the server 10, the storage 20, and the FC switch 100; however, each of the server 10, the storage 20, and the FC switch 100 can includes one FC port or two or more FC ports. Also, only one server and one storage are shown in the drawing; however, a plurality of servers 10 and storages can be connected to the FC switch 100.

Figure 2:
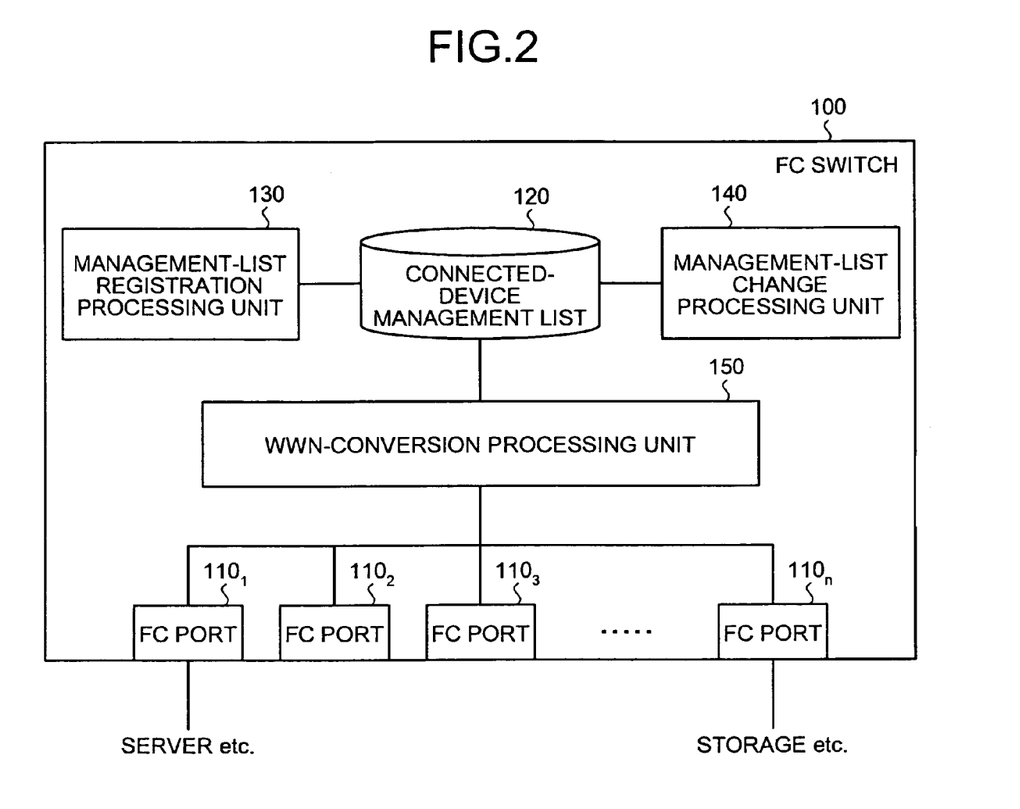
FIG. 2 is a functional block diagram of the FC switch shown in FIG. 1.

FIG. 2 is a functional block diagram of the FC switch 100. The FC switch 100 includes n, where n is a positive integer, FC ports $110_1$ to $110_n$, a connected-device management list 120, a management-list registration processing unit 130, a management-list change processing unit 140, and a WWN-conversion processing unit 150.

The FC ports $110_1$ to $110_n$ are connection ports for connecting the server 10, the storage 20, and the like to the FC switch 100.

Figure 3:
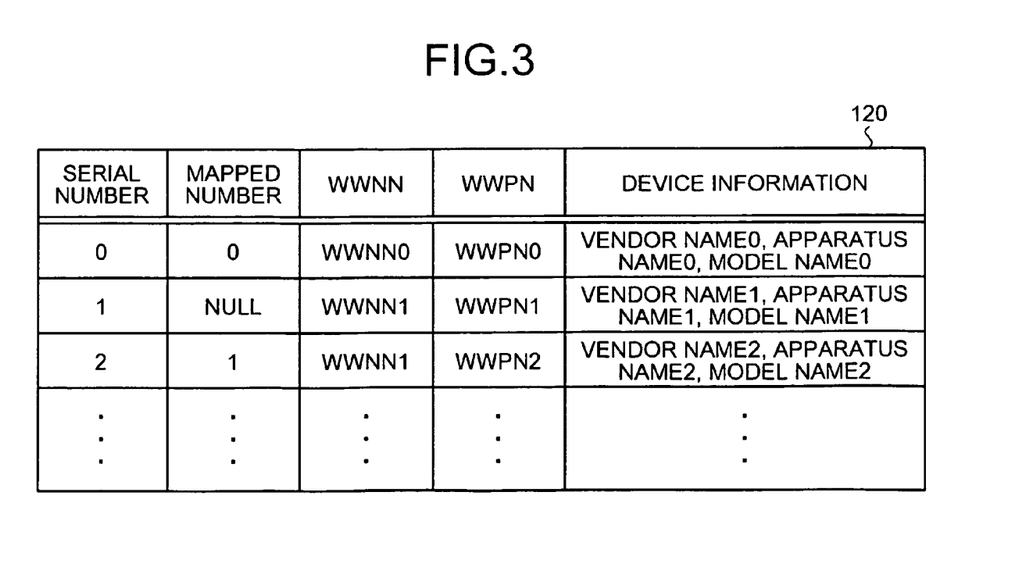
FIG. 3 is an example of the contents of a connected-device management list shown in FIG. 2.

The connected-device management list 120 stores therein connected-device-management information in which the device identification information of the FC network devices that are connected when the connection settings are specified is associated with device identification information of the FC network devices that are currently connected. FIG. 3 is an example of the connected-device management list 120. As shown in FIG. 3, the connected-device management list 120 stores therein the connected-device-management information in which serial numbers, mapped numbers, WWNs (WWNNs and WWPNs), and device information are associated with one another (WWN and the device information will be collectively referred to as "device identification information").

The serial number is a number assigned to each WWPN of the FC network device. The mapped number is a number used in WWN conversion processing performed by the WWN-conversion processing unit 150, which is described later. As an initial value of the mapped number, the same value as the serial number is set. When an FC network device is removed due to a failure or the like, a value (null in the example shown in FIG. 3) indicating that the WWPN of the FC network device has become invalid is set as the mapped number in device invalidation processing performed by the management-list change processing unit 140. Besides, when an invalid WWPN is assigned in mapping change processing performed by the management-list change processing unit 140, the serial number of the assigned WWPN is set as the mapped number. The device information includes the vendor name, the device name, and the model name of the FC network device. The connected-device management list 120 can be integrated into a database (DB) of a name service.

Returning to the description of FIG. 2, the management-list registration processing unit 130 obtains, when an FC network device is connected to the FC switch 100, the device identification information of the connected FC network device and registers the obtained device identification information in the connected-device management list 120.

Specifically, when an FC network device is connected to the FC switch 100 at the time the SAN is constructed or the FC network device is added, the management-list registration processing unit 130 obtains the device identification information (WWN and device information) from the connected FC network device and, after appending a serial number and a mapped number to the information, registers the information in the connected-device management list 120. At this time, a number following the last one of the serial numbers that have been registered so far is set as the serial number. The same number as the serial number is set as the mapped number.

As explained above, when an FC network device is connected to the FC switch 100, the management-list registration processing unit 130 obtains the device identification information of the FC network device, and registers the information in the connected-device management list 120. Thus, the connected-device management list 120 can be automatically generated or updated. Accordingly, it is possible to reduce the amount of labor required to change the settings.

Figure 5:
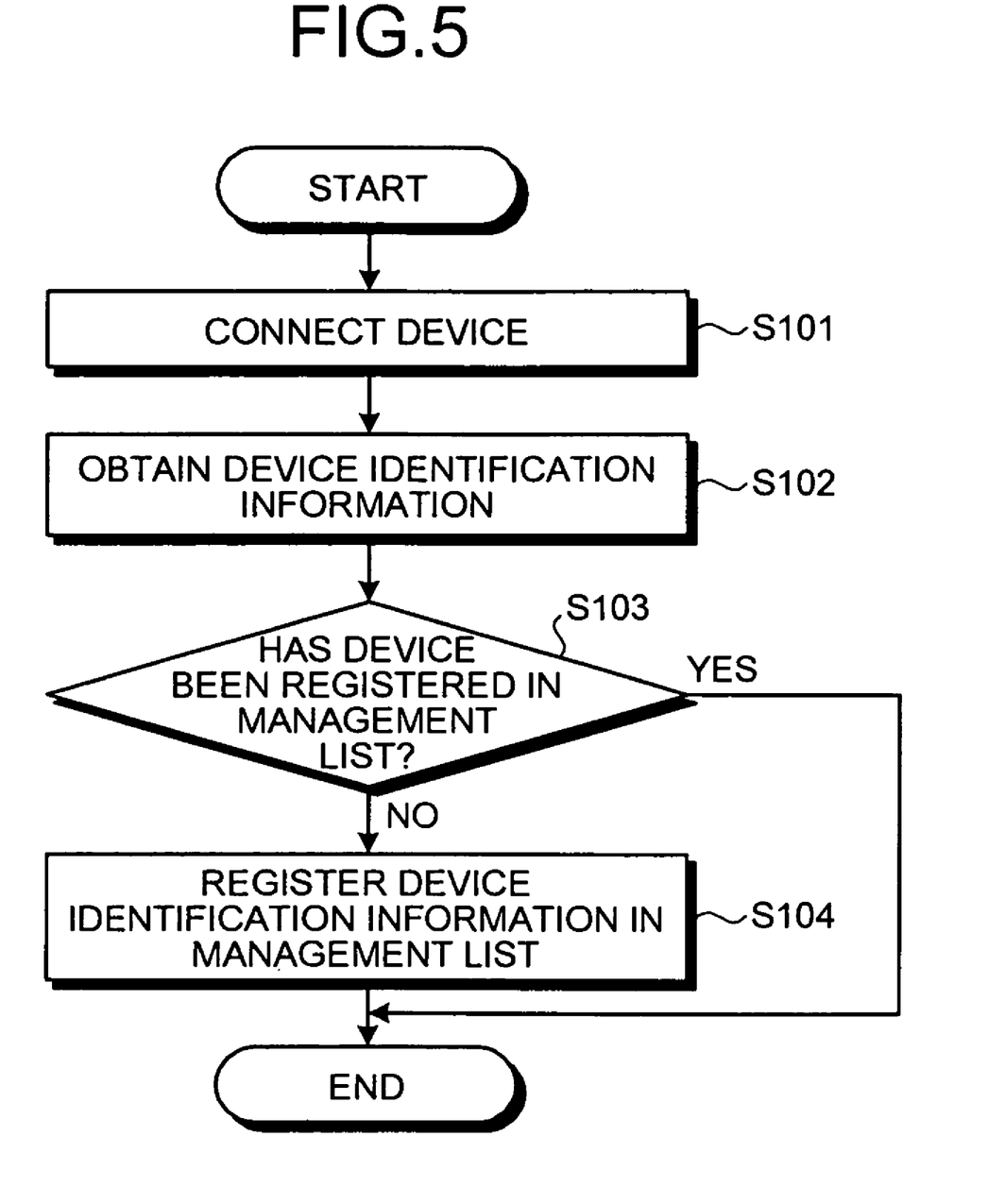
FIG. 5 is a flowchart of the operation of a management-list registration-processing unit shown in FIG. 2.

The operation of the management-list registration processing unit 130 will be explained later with reference to FIG. 5.

The management-list change processing unit 140 performs invalidation of device identification information (the device invalidation processing) and changes the association in the device identification information (the mapping change processing) based on an instruction from the user. For example, the management-list change processing unit 140 has an interface with a means for obtaining inputs from a user, such as an operation panel, a management terminal connected to a managed network, a management terminal connected to the SAN, or the like. According to an instruction from the user, the management-list change processing unit 140 performs processing related to a change in the device identification information registered in the connected-device management list 120.

Specifically, when having received an instruction from the user to invalidate a piece of device identification information, the management-list change processing unit 140 refers to the connected-device management list 120 based on the serial number specified by the user in the instruction, and obtains the piece of the device identification information (WWN and device information) corresponding to the serial number.

Subsequently, the management-list change processing unit 140 checks whether the information of the FC network device that matches the obtained piece of the device identification information exists in the name service information stored by the FC switch 100. When the information does not exist, the management-list change processing unit 140 determines that the FC network device identified by the piece of device identification information is not connected to the FC switch 100, and invalidates the piece of device identification information. The name service information used herein contains the device information (including the device identification information) of all the FC network devices that are connected to the FC switch 100 is specified. Due to the name service function of the FC switch 100, when an FC network device connected to the FC switch 100 is changed, the name service information is updated as needed so as to reflect the most up-to-date status.

In other words, the management-list change processing unit 140 sets a null value as the mapped number of a piece of connected-device-management information that corresponds to the serial number specified by the user, out of the pieces of the connected-device-management information that are stored in the connected-device management list 120.

The management-list change processing unit 140 invalidates the piece of device identification information of the FC network device removed from the SAN based on the instruction from the user. Thus, when any of the FC network devices is removed due to a failure or the like, it is possible to assign the device identification information of the removed FC network device to another FC network device that is newly connected.

On the other hand, when having received an instruction from the user to invalidate a piece of device identification information, the management-list change processing unit 140 extracts, based on the serial number of the piece of device identification information, from which a change is made, specified by the user, information indicating the same WWNN, the same vendor name, the same apparatus name, or the same model name from connected-device-management information stored in the connected-device management list 120. The management-list change processing unit 140 then notifies the extracted pieces of information to the user as candidates of device identification information, to which a change is made.

As just described, based on the instruction from a user, the management-list change processing unit 140 extracts candidates of device identification information to be associated with an FC network device newly connected to the network from the connected-device-management information stored in the connected-device management list 120, and notifies the extracted candidates to the user. Thus, when the user changes the association in the device identification information, it is possible to reduce labor of the user to find a suitable FC network device to which the change is made from among a large number of FC network devices that are connected to the SAN.

When the user has specified one of pieces of device identification information, to which the change is made, among the notified pieces of device identification information, the management-list change processing unit 140 refers to the connected-device-management information stored in the connected-device management list 120. When having determined that the mapped number corresponding to the piece of device identification information to which the change is made is a null value, and also that no connected-device-management information has been registered in the connected-device management list 120, which has the mapped number the same as the serial number corresponding to the piece of device identification information to which the change is to be made, the management-list change processing unit 140 determines that it is possible to perform mapping using the piece of device identification information as the one to which the change is made. Thus, the management-list change processing unit 140 performs mapping change for the piece of device identification information specified as the one to which the change is made.

In other words, the management-list change processing unit 140 specifies the serial number of the piece of device identification information to which the change is to be made and for which it has been determined that mapping is possible, as the mapped number of a piece of connected-device-management information that corresponds to the piece of device identification information specified by the user to make the change from, the piece of connected-device-management information being part of the connected-device-management information stored in the connected-device management list 120.

With this configuration, the management-list change processing unit 140 associates an invalidated piece of device identification information with an FC network device that has been newly connected to the network based on an instruction from a user. Thus, it is possible to use again the piece of device identification information of an FC network device that has been removed due to a failure or the like. Accordingly, it is possible to eliminate the need to change the settings of the device identification information, which usually takes place when an FC network device is replaced. It is therefore possible to reduce the amount of labor required to change the settings.

As explained above, the management-list change processing unit 140 changes the association in the device identification information in the connected-device-management information stored in the connected-device management list 120 based on the instruction from the user. Thus, even when an FC network device is replaced due to a failure or the like, it is possible to associate device identification information associated with the FC network device with an FC network device that is newly connected so that the device identification information that has been used in connection settings of the FC network devices can be used continuously. Accordingly, it is possible to eliminate the need to change the settings of the device identification information, which usually takes place when an FC network device is replaced due to a failure or the like. As a result, it is possible to reduce the amount of labor required to change the settings.

Figure 6:
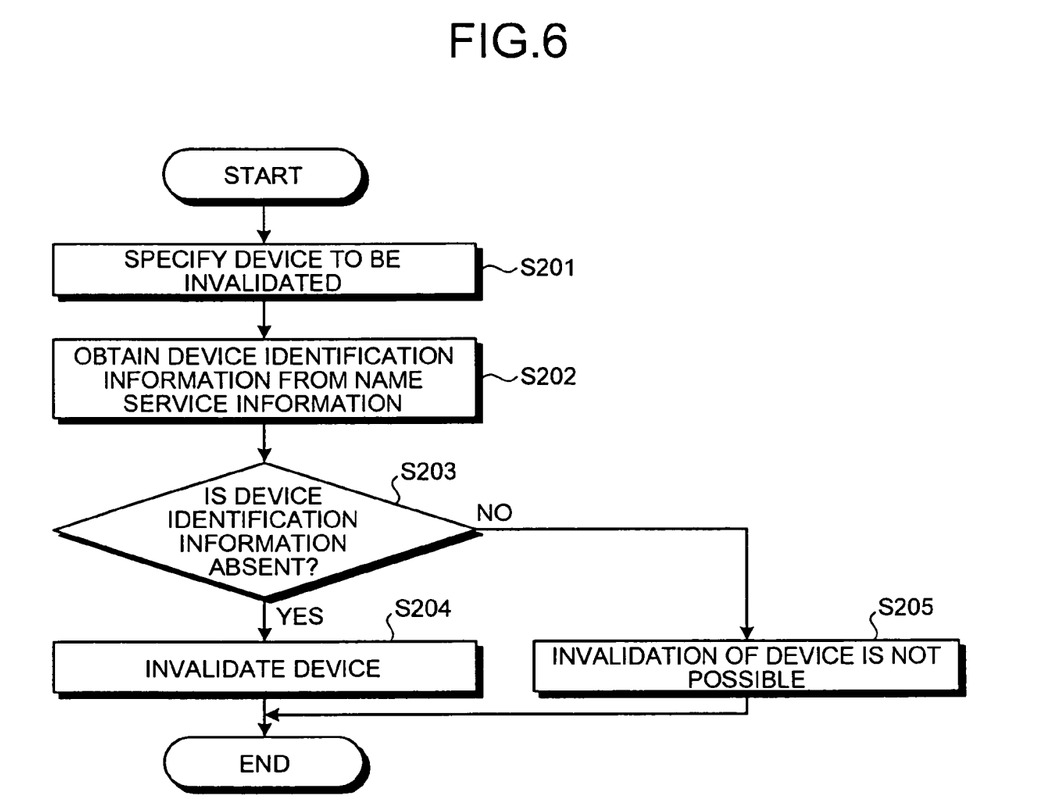
FIG. 6 is a flowchart of a device invalidation processing performed by a management-list change processing unit shown in FIG. 2.
Figure 7:
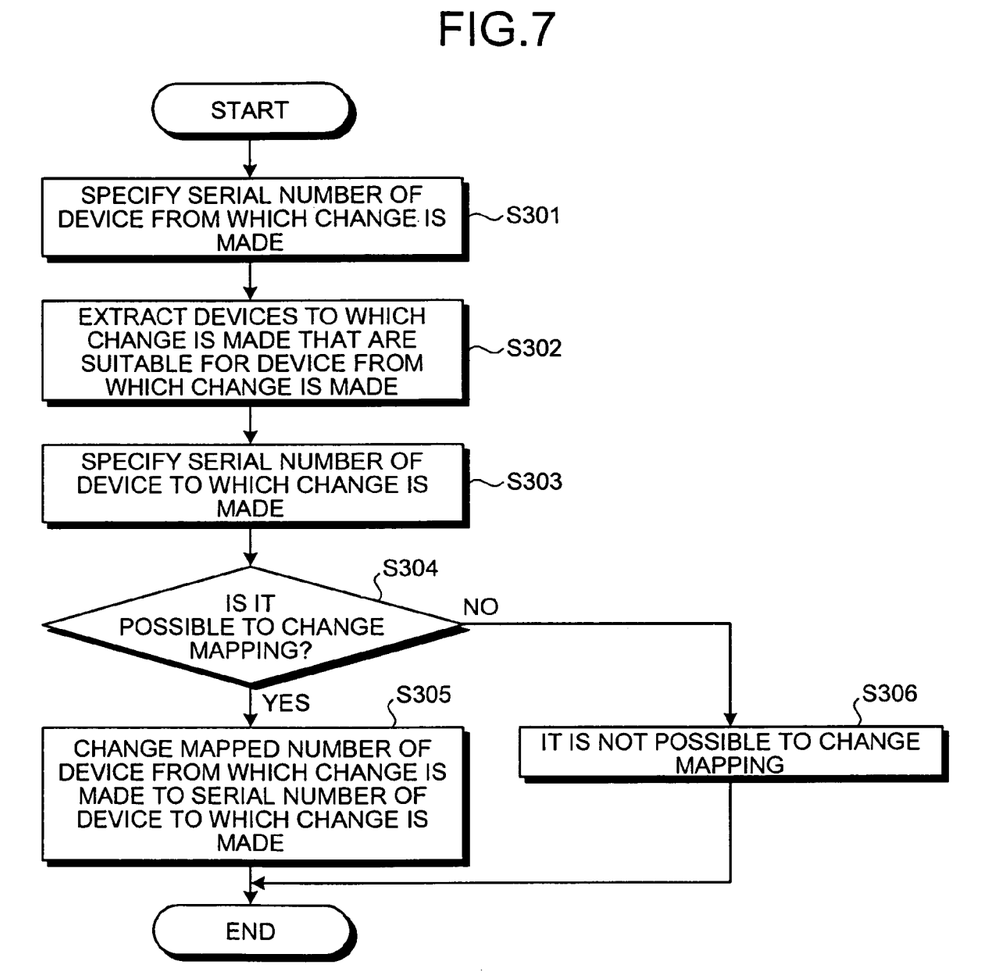
FIG. 7 is a flowchart of a mapping change processing performed by the management-list change processing unit.

The device invalidation processing and the mapping change processing performed by the management-list change processing unit 140 will be explained later with reference to FIGS. 6 and 7.

Next, the registration of the device information performed by the management-list registration processing unit 130 and the connected-device management list 120 updated through the device invalidation processing and the mapping processing performed by the management-list change processing unit 140 will be explained, with specific examples, referring to FIG. 4.

Figure 4:
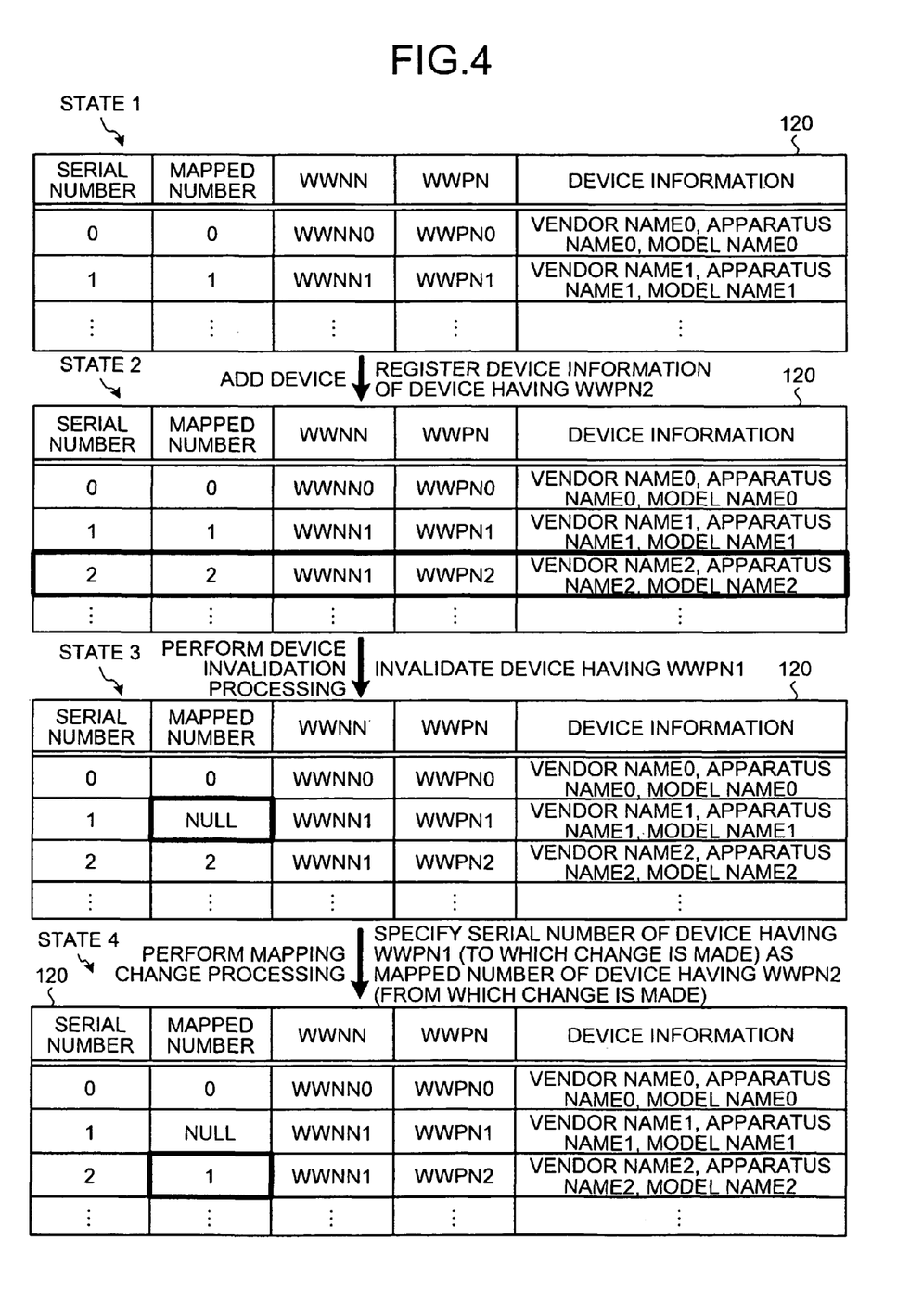
FIG. 4 is a schematic for explaining registration of device information and update of a connected-device management list shown in FIG. 2 through device invalidation processing and mapping change processing.

For example, as shown in state 1 in FIG. 4, in the connected-device management list 120, a piece of connected-device-management information, in which the serial number is 0, the mapped number is 0, the WWNN is WWNN0, the WWPN is WWPN0, and the device information is the vendor name: 0; the device name: 0; the model name: 0, is registered. Also, another piece of connected-device-management information, in which the serial number is 1, the mapped number is 1, the WWNN is WWNN1, the WWPN is WWPN1, and the device information is vendor name: 1; device name: 1; model name: 1, is registered.

In this situation, let us assume that a failure has occurred in the FC network device the WWPN of which is WWPN1. Then, as a replacement, the FC network device the WWNN of which is WWNN1, the WWPN is WWPN2, and the device information is vendor name: 0; device name: 0; model name: 0 has been connected to the FC switch 100. As a result, the management-list registration processing unit 130 newly registers a piece of connected-device-management information in which the serial number is 2, the mapped number is 2, the WWNN is WWNN1, the WWPN is WWPN2, and the device information is vendor name: 2; device name: 2; model name: 2 in the connected-device management list 120, as shown in state 2 in FIG. 4.

Subsequently, it is assumed that the user performs device invalidation processing on the FC network device with WWPN1 and in which the failure has occurred. Then, as shown in state 3 in FIG. 4, the management-list change processing unit 140 specifies a null value as the mapped number of the piece of connected-device-management information of the FC network device with WWPN1 registered in the connected-device management list 120.

Further, it is assumed that the user performs mapping change processing so as to change the WWPN of the FC network device with WWPN2 that has been newly connected (from which the change is made) to WWPN1, i.e., the WWPN of the FC network device in which the failure has occurred (to which the change is made). As a result, as shown in state 4 in FIG. 4, the management-list change processing unit 140 specifies the serial number 1 of the piece of connected-device-management information in which the WWPN is WWPN1 as the mapped number of the piece of connected-device-management information stored in the connected-device management list 120 in which the WWPN is WWPN2.

As just described, when an FC network device is replace, the association in the device identification information registered in the connected-device management list 120 is changed based on the instruction from the user. Thus, it is possible to use device identification information of the previously-connected FC network device as identification information of the FC network device that has been newly connected. Accordingly, it is possible to eliminate the need to change the settings in which the device identification information is used.

Returning to the description of FIG. 2, the WWN-conversion processing unit 150 transmits and receives data to and from an FC network device that is connected to the FC switch 100 after converting the WWN (WWNN and WWPN) included in the transmitted/received data into the WWN used in connection settings based on the connected-device-management information stored in the connected-device management list 120.

Specifically, when the FC switch 100 transmits and receives an FC frame, the WWN-conversion processing unit 150 obtains a piece of connected-device-management information that matches the WWN (WWNN and WWPN) specified in the transmitted/received FC frame from pieces of connected-device-management information stored in the connected-device management list 120.

When the serial number matches the mapped number in the obtained piece of connected-device-management information, the WWN-conversion processing unit 150 does not convert the WWN of the FC frame. When the serial number does not match the mapped number, the WWN-conversion processing unit 150 checks whether the mapped number of the piece of connected-device-management information is a null value.

When the mapped number is not a null value, the WWN-conversion processing unit 150 obtains a piece of connected-device-management information in which the serial number matches the number set as this mapped number from the connected-device management list 120. Then, the WWN-conversion processing unit 150 transmits and receives data after setting the WWN of the obtained piece of connected-device-management information in the FC frame.

On the other hand, when the mapped number is a null value, the WWN-conversion processing unit 150 obtains from the connected-device management list 120 a piece of connected-device-management information with a mapped number that matches the serial number of the piece of connected-device-management information. Then, the WWN-conversion processing unit 150 transmits and receives data after setting the WWN of the obtained piece of connected-device-management information in the FC frame.

As explained above, when transmitting and receiving data to and from a connected FC network device, the WWN-conversion processing unit 150 transmits and receives the data after converting the WWN specified in the transmitted/received FC frame to the WWN used in connection settings based on the connected-device-management information stored in the connected-device management list 120. Thus, it is possible to eliminate the need to change the settings of the device identification information, which usually takes place when an FC network device is replaced due to a failure or the like. Accordingly, it is possible to reduce the amount of labor required to change the settings.

Figure 8:
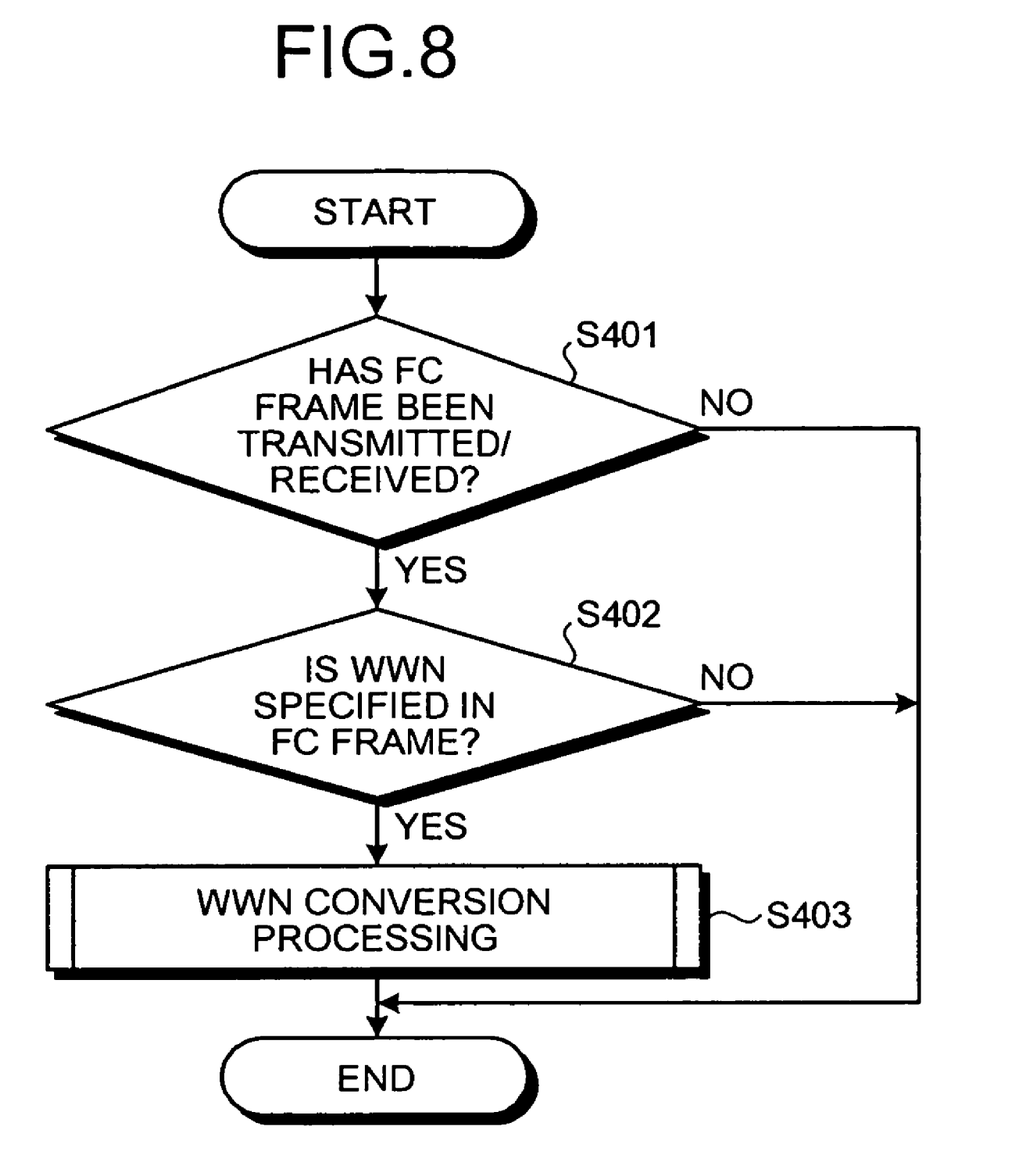
FIG. 8 is a flowchart of the operation of a WWN-conversion processing unit shown in FIG. 2.
Figure 9:
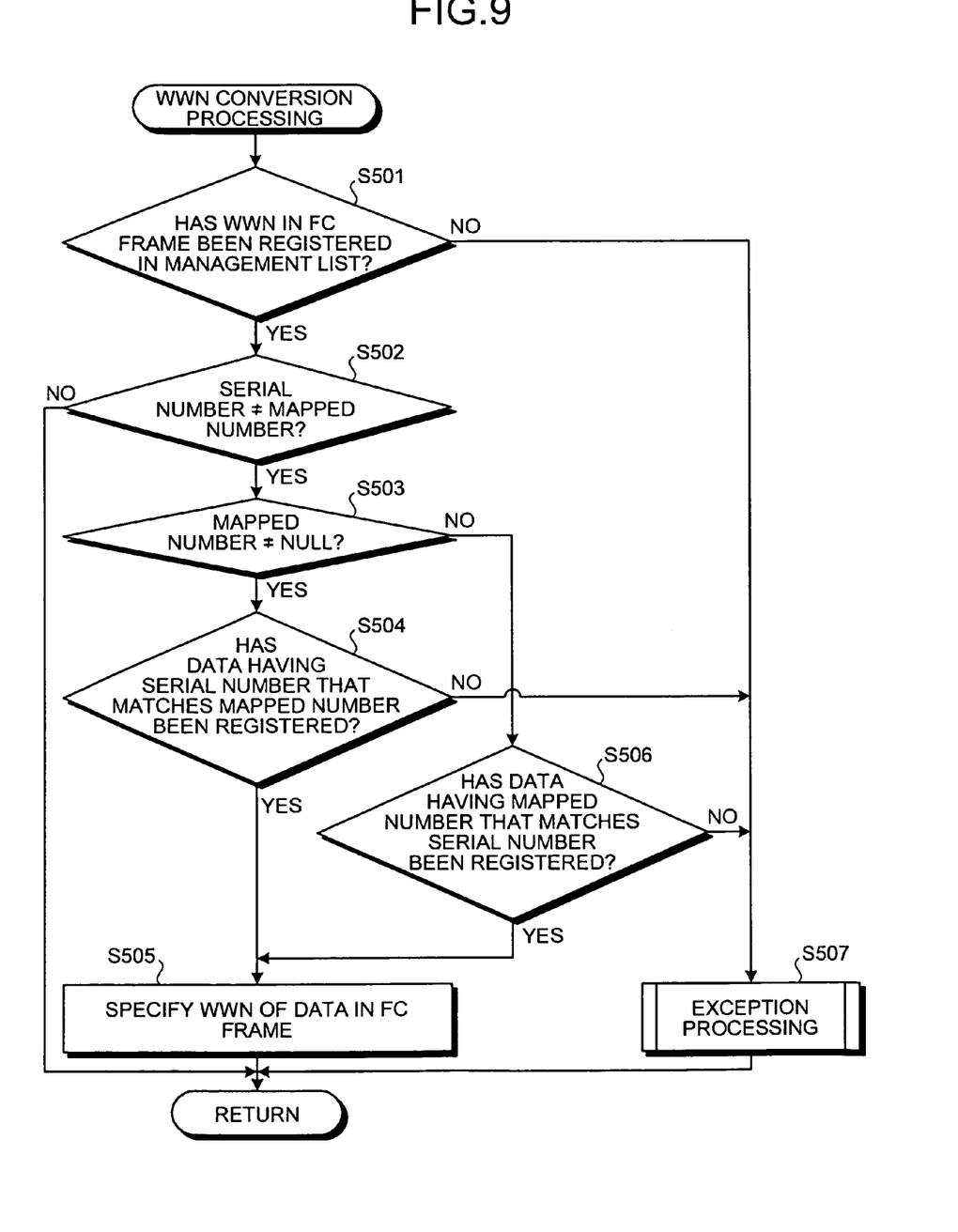
FIG. 9 is a detailed flowchart of a WWN conversion processing shown in FIG. 8.

The WWN conversion processing performed by the WWN-conversion processing unit 150 will be explained later with reference to FIGS. 8 and 9.

Next, the operation of the management-list registration processing unit 130 will be explained referring to FIG. 5. When an FC network device is connected to the FC switch 100, for example, at the time an SAN is constructed or the FC network device is added (step S101), the management-list registration processing unit 130 obtains device identification information of the connected FC network device (Step S102).

Then, the management-list registration processing unit 130 checks whether any device that corresponds to the obtained device identification information has already been registered in the connected-device management list 120. If not (No at step S103), the identification information is registered in the connected-device management list 120 (step S104).

On the other hand, when the device that corresponds to the obtained device identification information has already been registered in the connected-device management list 120 (Yes at step S103), the management-list registration-processing unit 130 does not perform the registration in the connected-device management list 120, and terminates the processing.

Next, the device invalidation processing performed by the management-list change processing unit 140 will be explained referring to FIG. 6. When the user specifies the serial number of an FC network device to be invalidated (step S201), the management-list change processing unit 140 obtains device identification information of the FC network device corresponding to the specified serial number from the name service information stored in the FC switch 100 (step S202).

In this situation, when the device identification information of the FC network device does not exist in the name service information (Yes at step S203), the management-list change processing unit 140 sets a null value as the mapped number of a piece of connected-device-management information with a serial number that matches the serial number specified by the user among pieces of connected-device-management information that are stored in the connected-device management list 120. Thereby, the FC network device corresponding to the serial number specified by the user is invalidated (step S204).

On the other hand, when the information of the FC network device exists in the name service information (No at Step S203), the management-list change processing unit 140 notifies the user that it is not possible to invalidate the FC network device (step S205).

Next, the mapping change processing performed by the management-list change processing unit 140 will be explained referring to FIG. 7. When the user has specified the serial number of an FC network device on which mapping is to be performed and from which the change is made (step S301), the management-list change processing unit 140 extracts pieces of device identification information of FC network devices that are suitable to be the one to which the change is made from the FC network device from the connected-device management list 120, and notifies the user of the extracted pieces of device identification information (step S302).

Then, when the user has specified an FC network device to be the one to which the change is made among the notified pieces of device identification information (step S303), the management-list change processing unit 140 determines whether it is possible to perform mapping of the FC network device. When it is possible to change the mapping (Yes at step S304), the management-list change processing unit 140 changes the mapped number of the FC network device from which the change is made to the serial number of the FC network device to which the change is made (step S305).

On the other hand, when it is not possible to change the mapping (No at step S304), the management-list change processing unit 140 notifies the user that it is not possible to change the mapping (step S306).

Next, the processing performed by the WWN-conversion processing unit 150 will be explained referring to FIG. 8. When the FC switch 100 transmits and receives an FC frame (Yes at step S401), the WWN-conversion processing unit 150 checks whether a WWN (WWNN and WWPN) is set in the FC frame transmitted/received. When a WWN is set (Yes at step S402), the WWN-conversion processing unit 150 performs WWN conversion processing for the FC frame (step S403).

Next, the WWN conversion processing will be explained referring to FIG. 9. In the WWN conversion processing, firstly, the WWN-conversion processing unit 150 checks whether any piece of connected-device-management information corresponding to the WWN set in the FC frame has been registered in the connected-device management list 120.

When a piece of connected-device-management information corresponding to the WWN has been registered (Yes at step S501), the WWN-conversion processing unit 150 checks whether the serial number matches the mapped number in the piece of connected-device-management information. When the numbers match (No at step S502), the WWN-conversion processing unit 150 terminates the WWN conversion processing.

When the serial number does not match the mapped number (Yes at step S502), the WWN-conversion processing unit 150 checks whether the mapped number in the piece of connected-device-management information is a null value. When the mapped number is not a null value (Yes at step S503), the WWN-conversion processing unit 150 checks whether data with a serial number that matches the mapped number of the piece of connected-device-management information has been registered in the connected-device management list 120.

When such data with the serial number that matches the mapped number has been registered (Yes at step S504), the WWN-conversion processing unit 150 performs the transmission/reception after setting the WWN of the data in the FC frame (step S505).

When the mapped number is a null value (No at step S503), the WWN-conversion processing unit 150 checks whether data with a mapped number that matches the serial number of the piece of connected-device-management information has been registered in the connected-device management list 120.

When such data with the mapped number that matches the serial number has been registered (Yes at step S506), the WWN-conversion processing unit 150 performs the transmission/reception after setting the WWN of the data in the FC frame (step S505).

When no piece of connected-device-management information that matches the WWN specified in the FC frame has been registered in the connected-device management list 120 at step S501, or when no data with a serial number that matches the mapped number of the piece of connected-device-management information has been registered in the connected-device management list 120 at step S504, or when no data with a mapped number that matches the serial number of the piece of connected-device-management information has been registered in the connected-device management list 120 at step S506, the WWN-conversion processing unit 150 determines that there is a contradiction in the mapping of the FC network devices, and performs predetermined exception processing such as to notify the user that it is not possible to convert the WWN (step S507).

As explained above, according to the embodiment, the connected-device management list 120 stores therein the connected-device-management information in which a WWN used in connection settings is associated with the WWN of an FC network device that is currently connected. When having received data from an FC network device currently connected, the WWN-conversion processing unit 150 converts the WWN specified in the received data to the WWN used in connection settings based on the connected-device management list 120. When transmitting data to an FC network device currently connected, the WWN-conversion processing unit 150 transmits the data after converting the WWN set in the data to be transmitted to the WWN of the FC network device that is currently connected based on the connected-device-management information. Thus, it is possible to eliminate the need to change the settings of the device identification information, which usually takes place when an FC network device is replaced due to a failure or the like. Accordingly, it is possible to reduce the amount of labor required to change the settings.

Besides, the World Wide Name (WWN) is used as the device identification information that uniquely identifies each FC network device. Thus, when a storage or a server is replaced in an SAN due to a failure or the like, there is no need to change the settings of various types in which WWNN and WWPN are used, such as zoning setting specified with an FC switch and target binding setting specified with a server. Accordingly, it is possible to reduce the amount of labor required to change the settings.

In the explanation of the embodiment, the connection of the CA in the storage 20 is changed. However, the present invention is not so limited. The present invention can be applied likewise to the case where the connection of other devices, e.g., the HBA in the server 10, that are connected to the FC switch 100 is changed.

In the description of the present embodiment, the present invention is applied to the FC switch. However, the present invention is not so limited. It is possible to apply the present invention likewise to storages. In such a case, the specified WWNs are converted between modules in the storage, such as the CA and an array controller.

As set forth hereinabove, according to an embodiment of the present invention, connected-device-management information is automatically generated. Thus, it is possible to reduce the amount of labor required to change the settings.

Further, the association among pieces of device identification information in the connected-device-management information is changed based on an instruction from a user. Thus, even when a network device is replaced due to a failure or the like, it is possible to associate device identification information used in the previous connection with a network device that is newly connected so that the device identification information used in connection settings of network devices can be used continuously. Accordingly, there is no need to change the settings of the device identification information, which usually takes place when an FC network device is replaced due to a failure or the like. As a result, it is possible to reduce the amount of labor required to change the settings.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for connecting storage devices with unique device identification information for each storage device in a network, the apparatus comprising:
   a storage unit that stores therein connected-device-management information in which first device identification information of a first storage device is associated with second device identification information of a second storage device, the first storage device being connected to the apparatus when the network was constructed, the second storage device being currently connected to the apparatus instead of the first storage device;
   a receiving unit that, when having received data from the storage device currently connected, converts the second device identification information set in received data to the first device identification information based on the connected-device-management information stored in the storage unit; and
   a transmitting unit that, when transmitting data to the storage device currently connected, transmits the data after converting the first device identification information set in the data to the second device identification information based on the connected-device-management information stored in the storage unit.

2. The apparatus according to claim 1, further comprising a registering unit that, when a storage device is connected to the network, obtains device identification information of the storage device, and registers the device identification information in the storage unit.

3. The apparatus according to claim 1, further comprising a changing unit that changes, based on an instruction from a user, correspondence between the first device identification information and the second device identification information in the connected-device-management information stored in the storage unit.

4. The apparatus according to claim 3, wherein the changing unit invalidates, based on an instruction from the user, device identification information of a storage device that is removed from the network.

5. The apparatus according to claim 4, wherein the changing unit associates, based on an instruction from the user, the invalidated device identification information with a storage device that is newly connected to the network.

6. The apparatus according to claim 5, wherein the changing unit extracts, based on an instruction from the user, candidates of device identification information to be associated with the storage device that is newly connected to the network from the connected-device-management information stored in the storage unit, and notifies the user of extracted candidates.

7. The apparatus according to claim 1, wherein a World Wide Name (WWN) is used as the device identification information.

8. A method for connecting storage devices with unique identification information for each storage device in a network, the method comprising:
  storing, in a storage unit, connected-device-management information in which first device identification information of a first storage device is associated with second device identification information of a second storage device, the first storage device being connected to an apparatus for connecting storage devices when the network was constructed, the second storage device being currently connected to the apparatus instead of the first storage device;
  converting, upon receiving data from the storage device currently connected, the second device identification information set in received data to the first device identification information based on the connected-device-management information; and
  converting, upon transmitting data to the storage device currently connected, the first device identification information set in the data to the second device identification information based on the connected-device-management information.

9. The method according to claim 8, further comprising obtaining, when a storage device is connected to the network, device identification information of the storage device, and registering the device identification information.

10. The method according to claim 8, further comprising changing, based on an instruction from a user, correspondence between the first device identification information and the second device identification information in the connected-device-management information.

11. The method according to claim 10, wherein the changing includes invalidating, based on an instruction from the user, device identification information of a storage device that is removed from the network.

12. The method according to claim 11, wherein the changing includes associating, based on an instruction from the user, invalidated device identification information with a storage device that is newly connected to the network.

13. The method according to claim 12, wherein the changing includes extracting, based on an instruction from the user, candidates of device identification information to be associated with the storage device that is newly connected to the network from the connected-device-management information, and notifying the user of extracted candidates.

14. The method according to claim 8, wherein a World Wide Name (WWN) is used as the device identification information.

15. A network system comprising:
  a storage device with unique device identification information;
  a server that accesses the storage device; and
  an apparatus for connecting the storage device and the server in a network, the apparatus including:
    a storage unit that stores therein connected-device-management information in which first device identification information of a first storage device is associated with second device identification information of a second storage device, the first storage device being connected to the apparatus when the network was constructed, the second storage device being currently connected to the apparatus instead of the first storage device,
    a receiving unit that, when having received data from the storage device currently connected, converts the second device identification information set in received data to the first device identification information based on the connected-device-management information stored in the storage unit, and
    a transmitting unit that, when transmitting data to the storage device currently connected, transmits the data after converting the first device identification information set in the data to the second device identification information based on the connected-device-management information stored in the storage unit.

* * * * *